Figure 1:
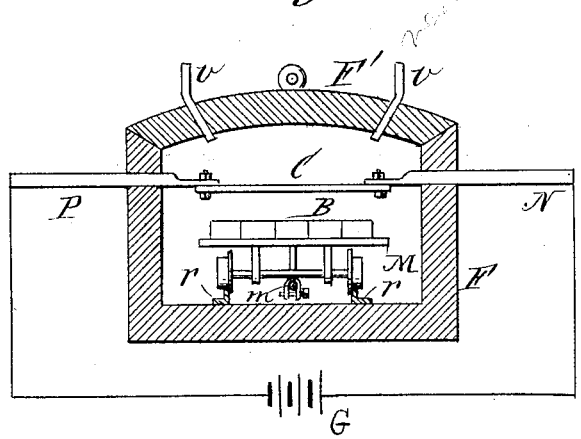

No. 669,567. Patented Mar. 12, 1901.
C. H. WATERMAN.
APPARATUS FOR ENAMELING SURFACES OF REFRACTORY MATERIALS.
(Application filed Apr. 25, 1899.)

(No Model.)

Witnesses:
D. W. Gardner
A. R. King

Inventor:
Charles H. Waterman
By his Attorney
George William Miatt

THE NORRIS PETERS CO., PHOTO-LITHO., WASHINGTON, D. C.

UNITED STATES PATENT OFFICE.

CHARLES H. WATERMAN, OF POMPTON PLAINS, NEW JERSEY.

APPARATUS FOR ENAMELING SURFACES OF REFRACTORY MATERIALS.

SPECIFICATION forming part of Letters Patent No. 669,567, dated March 12, 1901.

Application filed April 25, 1899. Serial No. 714,379. (No model.)

*To all whom it may concern:*

Be it known that I, CHARLES H. WATERMAN, a citizen of the United States, residing at Pompton Plains, Morris county, and State of New Jersey, have invented certain new and useful Improvements in Apparatus for Enameling the Surfaces of Refractory Materials, of which the following is a specification sufficient to enable others skilled in the art to which the invention appertains to make and use the same.

My invention relates to the art of enameling the surfaces of materials which are, relatively speaking, non-conductors of heat and electricity, such as those containing silicate of aluminium, as distinguished from articles composed of metal or other material of comparatively high conductivity.

My improvements are especially adapted to the enameling of the faces of bricks, tiles, and other articles of clay. In the enameling of bricks, &c., it has heretofore been customary to place three or four, with the enameling material applied thereto, in a muffler, a suitable number of mufflers being placed in a furnace, and the whole heated gradually for several days. The enameling material, being primarily in a soft state, is under these conditions apt to be discolored more or less by the products of combustion emanating from the fuel used. Furthermore, it is practically impossible to control the degree of heat or attain a uniform distribution thereof, so that results are uncertain, and the defective pieces usually average at least one-third of those treated. The bricks also become thoroughly and uniformly heated throughout, which is objectionable, as it is well known that bricks cannot be reheated without danger of deterioration, and the same is true to a greater or less extent of articles made from even the finer clays. The continued contraction of the clay long after the enamel has set and cooled also tends to crack or crease the enamel. From fifteen to eighteen days are required in firing and cooling, to say nothing of the labor and expense involved.

The main object of my invention is designed to afford adequate means for the fusion of enameling material onto the surfaces to which it is applied while the body of the article is relatively cool, according to the process set forth in my Letters Patent No. 640,844, dated January 9, 1900, the application for which was a subdivision of the present application, the object being to avoid the "crazing" of the enamel, that would otherwise result from the difference in contractibility, to avoid the loss from deterioration or fracture heretofore involved in enameling surfaces by reason of the refiring and reheating of the body of the article to the temperature required to fuse the enamel, as well as the deleterious effects upon the enamel of the presence of products of combustion, such as discoloration, impaired surface, &c. By my apparatus I furthermore simplify and quicken the manipulation involved in the art of enameling, and thereby materially cheapen the cost of the product commercially, while affording a superior article of manufacture.

My invention consists in the means herein described and claimed for "flashing" or quickly fusing enameling material onto the surface of an article of clay or other material of comparatively low conductivity as regards heat and electricity by exposing the said surface, with the enameling material applied thereto, in proximity to, but without contact with, an electric converter heated by an electric current to a sufficiently high temperature to fuse the enamel, the heat being applied directly to the enameling material in a plane parallel thereto in such manner as to penetrate through said enameling material before reaching the surface to which it is to be fused, whereby I am enabled to "flash" or effect the adhesion of the enamel over the entire underlying surface while the body of the article is comparatively cool, and then effect the removal of the article before the mass of material of which it is composed becomes unduly, unnecessarily, or dangerously heated and while practically and relatively cold. As a result the integrity of the article both in form and structure is retained unimpaired, and the enamel after it has set is not distorted, cracked, or crazed by the subsequent shrinkage or contraction of the article, neither is the surface of the enamel contaminated by products of combustion. A special feature of my invention in this connection consists in the interposition between the electric heater and the surface of the article to be enameled of a non-oxidizable shield for the purpose of intercepting any particles that may be given off by the electric converter during use—as, for instance, where carbon is used as a medium of resistance in attaining the requisite degree of electrical heat. Thus by the use of electricity as a heat medium I am enabled to quickly attain a comparatively high degree of uniform electrical heat in a converter having a comparatively large extension of heating-surface, the heat being uniform over the whole area thereof and under perfect control, so that the enamel and the underlying surface are raised to the requisite degree of temperature without exposing the other surfaces of the article to direct radiation or the enamel to contamination by reason of particles given off by the converter. By thus heating the surface underneath the enamel only to a relatively high degree of heat by direct radiation I avoid the harmful effects heretofore resulting from the difference in contractibility between the enamel and the mass of material, to one surface of which it is applied.

Figure 2:
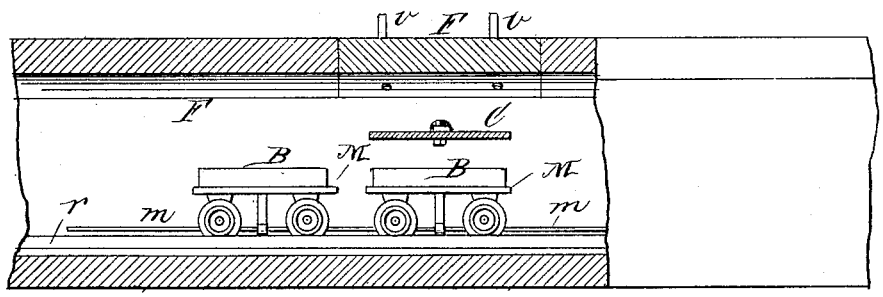
Figure 3:
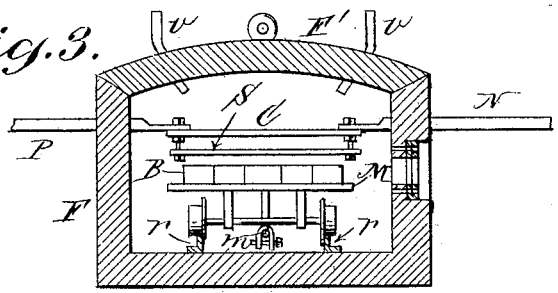

In the accompanying drawings, Figure 1 is a transverse section of an electric furnace adapted to the enameling of tiles, bricks, and like articles. Fig. 2 is a longitudinal section of the same; Fig. 3, a view similar to Fig. 1, showing a non-oxidizable shield interposed between the converter and the articles to be enameled.

In the drawings, which are mainly symbolic, I show an electric converter or heater C as consisting of a plate—say of carbon or any suitable material affording the desired electric resistance—interposed between and connected to the terminals P and N of an electric circuit connected with a suitable source of electricity G.

I prefer to inclose the electric heater or converter C in a furnace or muffle F, of refractory material, and to extend such furnace or muffle in either direction considerably beyond the position of the converter C, under which the actual fusion of the enameling material takes place. The articles B to be enameled are presented successively to the action of the electric converter C by any appropriate mechanical expedient, as by means of movable platforms M. Thus the platforms may consist of a series of cars or trucks upon the longitudinal rails $r\ r$, the trucks being coupled together or to a cable $m$, or an endless belt or chain platform, of refractory non-combustible material may be substituted, if desired. The top of the furnace F is preferably made with one or more movable sections F' for convenience of access, and the furnace or walls of refractory material preferably extend beyond the electric converter C a distance sufficient to admit of the gradual cooling of the articles treated before removal.

The electric converter C may be made of any suitable medium affording a relatively high degree of resistance to the electric current, as before intimated. Where a carbon plate is used for the purpose, I interpose between it and the surfaces to be enameled a shield S, of non-oxidizable material, capable of resisting while transmitting a relatively high degree of heat. This is for the purpose of intercepting particles of carbon that may be given off by the electrical converter under the action of the electric current and may be effected by suspending the plate S, of platinum or other suitable material, as in Fig. 3, between the electric converter C and the means for presenting the surfaces to be enameled by the electric heat generated in the converter C or by plating or otherwise covering the converter with a suitable non-oxidizable material.

Vents $v\ v$ may be provided for the escape of carbon dioxid or other gas generated in the furnace, and the usual window for inspection may be inserted in the wall of said furnace or muffle.

The enameling material is applied to the surfaces to be enameled prior to subjecting them to the action of electric heat emanating from the converter C in any suitable or well-known manner, and the articles are presented to the electrical converter C continuously or intermittently, as may be desired.

What I claim as my invention, and desire to secure by Letters Patent, is—

1. In apparatus for flashing enamel upon the surface of refractory material, the combination of an electrical converter having a broad heating-surface, and mechanism for presenting a surface of refractory material in a plane parallel to said heating-surface in proximity thereto but out of contact therewith, whereby the enamel is immediately fused to the surface of refractory material upon which it is imposed by a uniform degree of electric heat applied simultaneously and instantaneously over all parts of the enamel, substantially as herein set forth.

2. In apparatus for flashing enamel upon the surface of refractory material, the combination of an electrical converter having a broad heating-surface, walls of refractory material inclosing said electrical converter, and mechanism for presenting a surface of refractory material in a plane parallel to said heating-surface, in proximity thereto but out of contact therewith, whereby the enamel is immediately fused to the surface of refractory material upon which it is imposed by a uniform degree of electric heat applied simultaneously and instantaneously over all parts of the enamel, substantially as herein set forth.

3. In apparatus for flashing enamel upon the surface of refractory material, the combination of an electrical converter having a broad heating-surface, walls of refractory material inclosing said electrical converter, a non-oxidizable shield interposed between said electric converter and the surface to be enameled, and mechanism for presenting a surface of refractory material in a plane parallel to said non-oxidizable shield in proximity thereto but out of contact therewith, whereby the enamel is immediately fused to the surface of refractory material upon which it is imposed by a uniform degree of electric heat applied simultaneously and instantaneously over all parts of the enamel and the latter is protected from contamination by contact with emanations from the electrical converter, substantially as herein set forth.

CHAS. H. WATERMAN.

Witnesses:
    GEO. WM. MIATT,
    D. W. GARDNER.